April 30, 1963  G. S. DOMAN ETAL  3,087,690
ROTOR WITH TWO JOINTS IN DRIVE SHAFT
Filed Jan. 30, 1961  3 Sheets-Sheet 1

INVENTORS
GLIDDEN S. DOMAN
STEPHEN DuPONT
BY John M. Montstream
ATTORNEY

April 30, 1963  G. S. DOMAN ETAL  3,087,690
ROTOR WITH TWO JOINTS IN DRIVE SHAFT
Filed Jan. 30, 1961  3 Sheets-Sheet 2
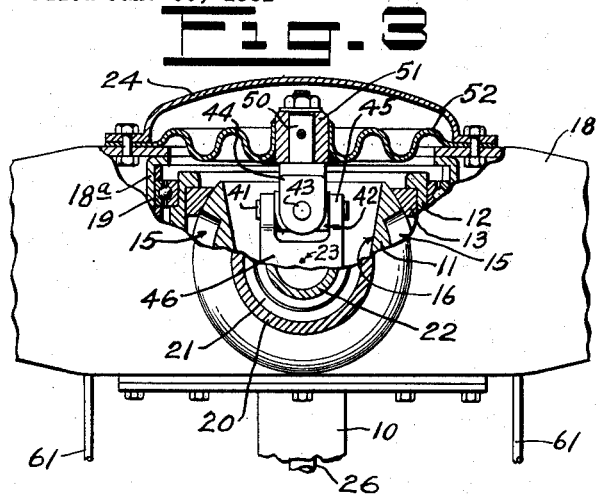
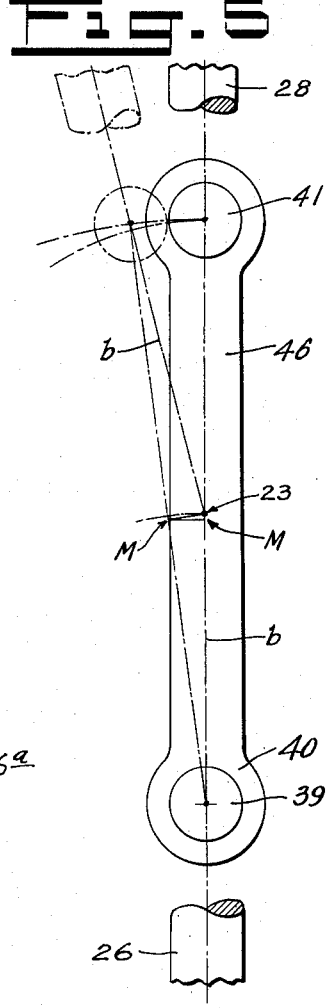
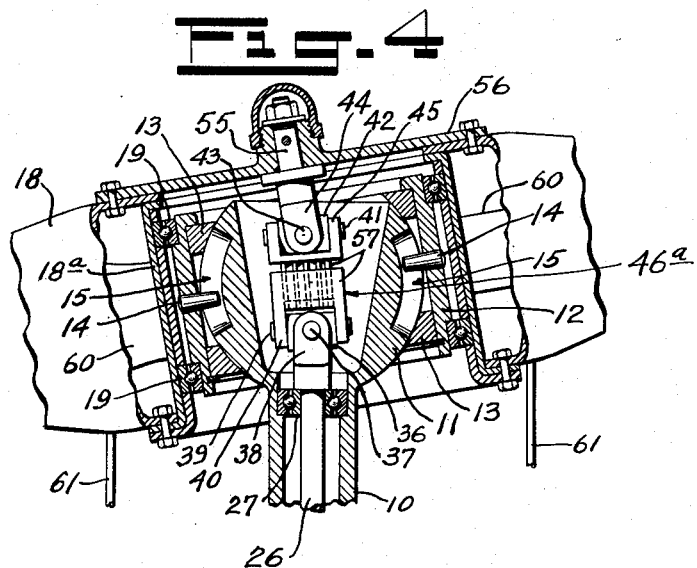
INVENTORS
GLIDDEN S. DOMAN
STEPHEN Du PONT
BY
John M. Montstream
ATTORNEY April 30, 1963   G. S. DOMAN ETAL   3,087,690
ROTOR WITH TWO JOINTS IN DRIVE SHAFT
Filed Jan. 30, 1961   3 Sheets-Sheet 3
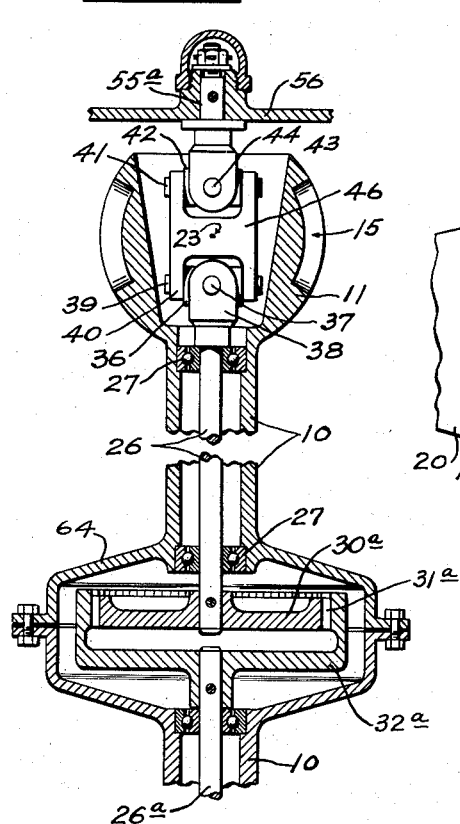
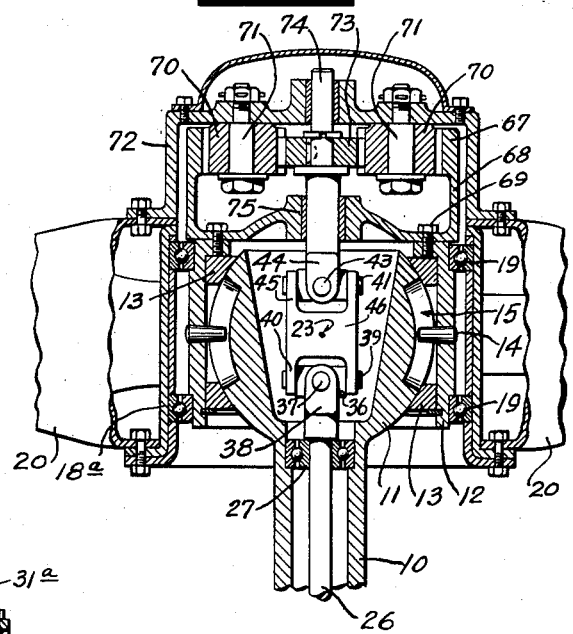
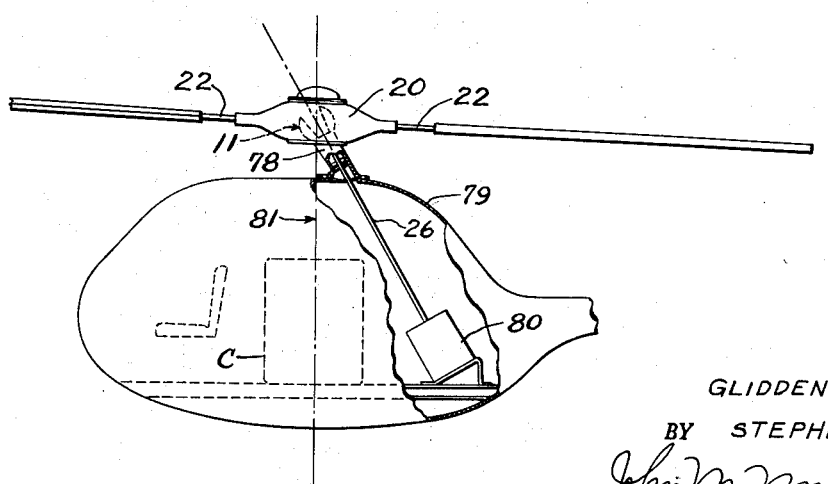
INVENTORS
GLIDDEN S. DOMAN
BY STEPHEN DuPONT
ATTORNEY United States Patent Office 3,087,690
Patented Apr. 30, 1963

3,087,690
ROTOR WITH TWO JOINTS IN DRIVE SHAFT
Glidden S. Doman, Ridgefield, and Stephen du Pont, Southbury, Conn., assignors to Doman Helicopters, Inc., Danbury, Conn., a corporation of Delaware
Filed Jan. 30, 1961, Ser. No. 85,843
10 Claims. (Cl. 244—17.27)

The invention relates to a rotor for an aircraft which may be used in a helicopter as the main rotor in large size and the tail rotor in smaller size and with an airplane propeller. The invention is more particularly directed to the free floating type of rotor such that the rotor may freely change its angular position with respect to the pylon under the influence of gusts of wind or changes in the cyclic pitch of the blades. In the drive shaft of this type of rotor the use of a constant velocity joint has been required in order to overcome the transfer of vibration from the drive shaft to the rotor and particularly to the blades. Such constant velocity joints, as they are known in the art, are difficult to design for the high torques and rotational velocities characteristic of this type of service without excessive lateral dimension and overall bulkiness which necessarily requires enlargement of surrounding rotor head parts and thereby multiplies the increase in lateral dimension, bulk, weight and cost in the rotor head. The invention herein provides a construction of rotor utilizing a drive shaft universal joint unit including two common Cardan joints connected together which unit by virtue of its construction and location with respect to the head universal joint gives a constant velocity or practically constant velocity drive from the drive shaft to the rotor head at all angular or tilt positions of the rotor head.

It is an object of the invention to construct a rotor for a helicopter of the type which is mounted on a universal joint for freely tilting thereon and which secures constant velocity or practically constant velocity drive in all tilt positions of the rotor head from the drive shaft utilizing a pair of common type of Cardan joints connected one to the other with the joints equally spaced or closely equally spaced on opposite sides of the center of the rotor universal joint which mounts the rotor head.

Another object is as above and includes an axially movable connection in the drive shaft and preferably located inboard or outboard of the Cardan joints so that the connection may be substantially larger than a cavity within the universal joint for the rotor.

Another object is to direct the drive shaft between the motor and the rotor at a substantial angle so that the motor at the floor or platform level is well away rearwardly from a vertical axis through the rotor center leaving this area free for cargo.

A still further object is to provide a constant velocity Cardan joint unit which provides angular drive through needle or roller bearings to reduce Hertz stresses so that smaller Cardan joints may be used.

Other objects of the invention will be more apparent from the following description when taken in connection with the accompanying drawings illustrating preferred embodiments thereof in which:

FIG. 3 is a view similar to FIG. 2 of another form;

FIG. 4 is a view of a head with a spline in the connecting link between joints;

FIG. 5 is a diagrammatic view illustrating the geometry of the drive shaft universal joint unit;

FIG. 6 is a view of the pylon inboard of the pair of universal joints with an axially movable connection;

FIG. 7 is a view of a rotor having a reduction gear unit also serving as the axially free connection; and FIG. 8 is a view of a helicopter cabin and rotor with inclined pylon.

Figure 1:
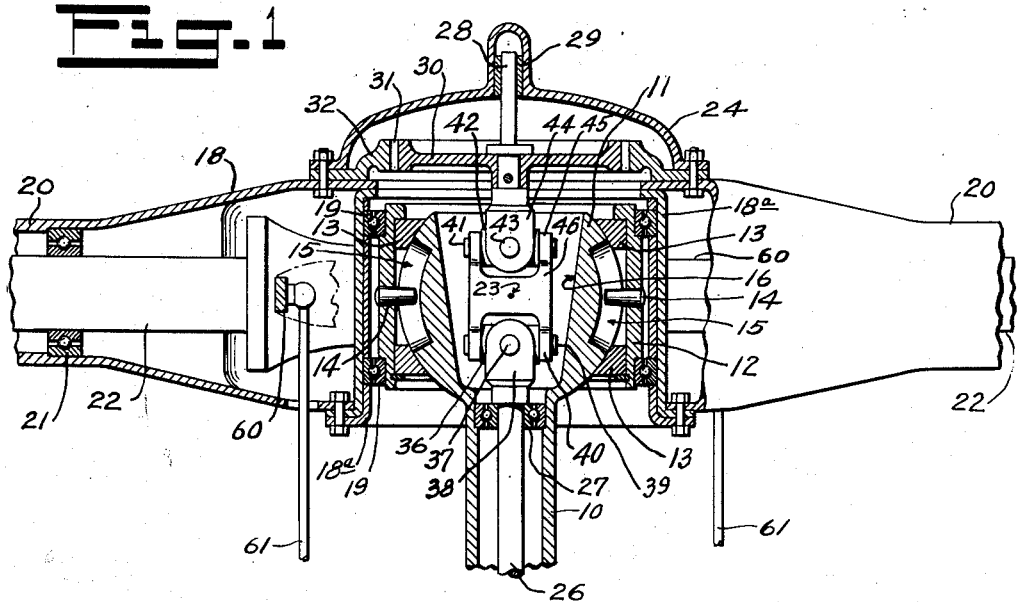
FIG. 1 is a longitudinal section through a helicopter rotor with the double Cardan joint unit and spline.

The rotor includes a stationary and hollow or tubular pylon 10 carried by the fuselage of the aircraft. A universal joint of any suitable construction is carried on the top of the pylon. The universal joint particularly shown is a portion of a sphere 11 on which is mounted an outer shell 12. This shell has spaced bearings or bearing rings 13 which engage the sphere and permit the outer shell to assume any angular position with respect to the sphere through the range of the joint which usually is 10 to 15 degrees. With the sphere type of joint, the outer shell is held against rotation in any suitable fashion such as by a key 14 carried by the shell and received in a key slot 15 carried by the sphere. The sphere has an internal cavity 16.

A rotor hub 18 and its bearing shell 18a, secured thereto such as by bolts, is rotatably mounted on the outer shell 12 on bearings 19. This rotor hub carries a plurality of radially projecting arms 20 each having spar bearings 21 for oscillatably mounting a spar 22 of a blade. Preferably each blade has solely oscillation movement about its longitudinal axis. The rotor hub may include a cover 24 bolted thereto. For a main rotor hub, the blade spar is connected through suitable connections to a swash plate for at least collective control and for a rotor head usually includes cyclic control of the pitch of the blades as shown in the aforesaid Doman et al. application. For a tail rotor, cyclic pitch control of the blades is not provided. The center of the universal joint mounting of the rotor head or hub is at a point 23. The rotor head has complete freedom to tilt on its universal joint mounting so that its angle of tilt may change under various causes such as under the influence of a gust of wind, by cyclic control of the blades from a swash plate, and the like.

The rotor head is rotated from the motor of the aircraft through a drive shaft 26 extending upwardly through the hollow pylon. The drive shaft is mounted in the pylon by suitable bearings 27. The drive to the head is from the shaft through a universal joint unit, which unit will be described hereinafter. The universal joint unit includes a pair of Cardan joints within the sphere cavity or rotor universal joint 16. The universal joint unit is connected to a stub shaft 28 which is secured to the rotor hub such as by a bushing means 29. The connection between the stub shaft and the rotor hub is through an axially free connecting means, particularly shown as a spline or slip connection including a driving spline plate 30 having a connection through splines 31 with a driven spline ring or plate 32 secured to the rotor hub.

The universal joint unit 35 includes two common Cardan or universal joints connected one with the other or in series and phased 90 degrees apart. The universal joint unit includes a first or inboard joint having a center pivot block 36 with a pivot or pivot means 37 received by a drive fork 38. This drive fork is carried on the end of the drive shaft 26. A second pivot or pivot means 39 is carried by the center pivot block which pivot means is displaced 90 degrees from the pivot means 37 and pivotally mounts a driven fork 40. The axes of the two pivot means usually and desirably intersect. This driven fork in the construction of FIG. 1, is a part of an integral connecting link 46 between the two Cardan joints. The second or outboard universal or Cardan joint includes a pivot or pivot means 41 carried by a center block 42 and pivotally connected with a driven fork 45 carried by and integral with the other end of the center or connecting link 46. The center block 42 carries a second pivot or pivot means 43 which pivotally mounts a driven fork 44 which pivot means is spaced 90 degrees with respect to the pivot means 41 and it is usual for the axes of these two pivot means to intersect. The length of the connecting link 46 may be long or short, however, as illustrated this link is short so that the two joints are within the cavity 16 of the pylon or rotor universal joint.

The two Cardan joints are phased 90 degrees apart in that the drive fork 38 of the first Cardan joint has its pivot means 37 at right angles or at a 90° angle with respect to the pivot means 41 of the drive fork 45 of the second universal or Cardan joint. It is desirable that the friction at all pivot means of the two Cardan joints be at a minimum and hence antifriction bearings or antifriction mounting is used as will appear.

Also the center of the connecting or center link 46, or particularly the midpoint between the pivot means 39 and 41 when in alignment with the axis of the drive shaft is at or close to or in the region of the center point 23 of the rotor universal joint or the center of the spherical member 11. As a consequence of the universal joints of the drive shaft joint unit being phased 90 degrees apart, the output of the universal joint unit is true constant velocity at all angles, or closely approximates constant velocity, since the variable velocity of the first or lower joint is compensated for by the variable velocity of the second or upper universal joint at the same angle or substantially the same angle for all angular or tilt positions of the rotor head. As a consequence the universal joint unit can tolerate greater angular displacement. It would be desirable to locate, or optimum overall results would be secured by locating, the midpoint M (FIG. 5) of the connecting link 46 when the stub shaft and the drive shaft are in alignment or the rotor head is at right angles to the drive shaft, a distance slightly below the center point 23 of the pylon universal joint 11. The distance below is such that the projection at right angles to the connecting link of the midpoint M onto the axis of the drive shaft 26 in the normal operating angular or tilt position of the head will pass through the point 23 or the center of the rotor universal joint. So positioned, optimum velocity compensation between the two universal joints of the universal joint unit 35 would be secured in this position of the rotor head or hub since the angles of bend or displacement of each universal joint are equal and the legs (b) of the triangle (FIG. 5) are equal. The tilt of the rotor head of a helicopter at cruising speed may be much higher than as presently practiced and tilt angles as high as 30 degrees are anticipated and higher angles are probable because of the higher speeds made possible by improvements in helicopter design. Present day tilt angles are of the order of 10 degrees for forward flight.

For the shaft universal joint unit as in FIG. 4 with a spline in the center link, the angles of the two joints are precisely equal for all tilt positions of the rotor head. In other words, this center link has a variable midpoint, the projection of which always passes through the rotor joint center 23 for all angular positions of the head when the midpoint is coincident with the point 23 when the universal joints are in alignment.

With the rotor or rotor hub 18 changing its angular position with respect to the pylon, and with the dimension between the pivots 39 and 41 or pivots 37 and 43 being constant, this results in axial changes in the position of the stub shaft 28. When the drive shaft 26 and the stub shaft 28 are in axial alignment, the stub shaft is in its lowest relative position with respect to the bearing 29 or the rotor hub 18. It is for this reason that a shaft universal joint unit includes connecting means having axial freedom of movement. In the construction of FIG. 1 this connecting means is between the stub shaft and the rotor hub.

When a spline connecting means is used within the rotor universal joint cavity 16 between the universal joint and the rotor head or in the connecting link as illustrated in FIG. 4, the small diameter slip spline would have higher friction loads resulting from the relatively small diameter of the spline circle and Brinelling or wear would form steps in the splines relatively more quickly. Sliding loads are substantially reduced by locating the spline means above or below the universal joint for the rotor head where the spline need not be within the smaller confines of the cavity 16 in the universal joint 11 but permits this spline to be substantially enlarged without enlarging the rotor universal joint and the surrounding rotor head parts. The location of the spline above, rather than below, the pylon universal joint is more easily accomplished, because of less other structure, in an enlarged cavity provided in the rotor hub or the cover 24 thereof. This larger diameter substantially reduces the torque or the torque load to which the spline teeth are subjected thereby reducing friction loads thereon and substantially reducing wear in proportion to the relative diameter of such spline with respect to the diameter of a smaller spline located within the cavity 16 of the sphere 11.

Figure 2:
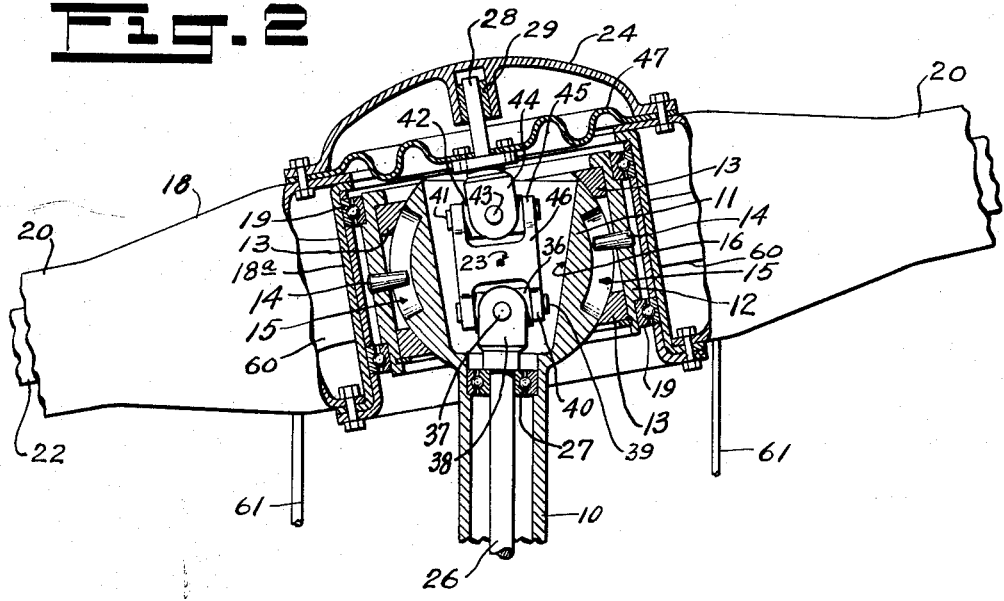
FIG. 2 is a view similar to FIG. 1 but using a resilient axial connection as an alternate to a spline or slip connection.

FIG. 2 shows a construction of an axially extensible connecting means which may be substituted for the slip or spline means described as to FIG. 1 and comprises a flexible drive disk 47, the center of which is secured to the stub shaft 28 and its periphery is secured to the rotor hub 18. This disk has axial flexibility which is relatively soft so that it yields readily in an axial direction but has torque rigidity so that it will transmit full torque loads between the shaft universal joint or the stub shaft and the rotor hub. Functionally this form is similar to the spline means, since both have axial freedom of movement and torque rigidity to transmit torque loads between the shaft universal joint and the rotor hub. Here again by locating the flexible disk above the rotor head universal joint and its cavity, it may be of substantial diameter giving greater axial softness or requiring less axial force in order to flex the same than that required for a smaller diameter disk located in the rotor joint cavity.

With a spline of relatively small diameter as when confined within the cavity of the rotor universal joint, the individual tooth pressures on the spline are higher and hence offer greater resistance to axial movement. The torque loads are inversely proportioned to diameter and the tooth pressures are inversely proportional to the squares of the diameter. For this diameter of spline, a ball or roller or antifriction type probably would be required and would be desirable, but not mandatory, for the larger diameter of slip spline 31 of FIG. 1. As to the amount of axial movement to be provided by the axially flexible coupling or connection, the elastic deflection of the rotor head parts under the weight supported by the rotor must be added to the axial extension required by the universal joint unit. Although these deflections are not large, the load created thereby would be transmitted to the universal joints and their support bearings which is unnecessary.

FIG. 3 shows a construction similar to that of FIG. 2. In this construction the stub shaft 50, which is part of the driven fork 44 is secured to a bearing 51 which bearing is secured to the center of a flexible disk 52 such as by welding. The portion of the disk between the stub shaft or disk center and the outer edge is axially flexible and torque rigid to drive the rotor head 18, and permits axial movement of the stub shaft relatively to the rotor hub 18 upon tilt of the rotor hub.

FIG. 4 shows a construction of drive shaft universal joint unit in which the connecting link 46 carries or is provided with a slip spline. In this construction, the stub shaft 55 is secured to the cover plate 56 which is bolted to the rotor hub 18 so that the stub shaft does not have any axial movement. The connecting or center link 46a of the drive shaft universal joint unit carries a slip spline 57 which permits axial movement of the outboard universal joint with respect to the inboard universal joint of the universal joint unit upon tilt of the rotor hub 18 or head.

FIG. 6 shows a construction of rotor head with an axially free spline in the drive shaft located inboard of or below the two universal joints. The pylon 10 carries an enlargement or housing 64, preferably located below a swash plate mechanism, in which housing is received an outer spline ring 32a which is secured to one end of the drive shaft 26a and a spline cylinder or gear 30a secured to the adjacent end of the drive shaft 26 with the spline teeth 31a interengaging for axial freedom of movement and torque rigidity or drive. This spline is essentially the same as that shown in FIG. 1. The stub shaft 55a is secured to the rotor cover 56. This spline may be substituted by a reduction gear unit as described in connection with FIG. 7.

FIG. 7 shows the construction associated with a reduction gear unit of any suitable form, carried by the rotor head. The gear unit particularly illustrated is of the planetary type having a fixed sun gear 67 which is carried by the casing 68. The casing is secured to the non-rotating shell 12 by bolts 69. Planet gears 70 are rotatably mounted on pins 71 carried by a rotor hub cover 72 and mesh with the sun gear. The cover 72 is bolted to the rotor hub 20. A pinion gear 73 is secured to a stub shaft 74 and meshes with the planet gears. The casing 68 carries a bearing 75 for the stub shaft. The pinion gear and the planet gears provide and function together as a spline for axial freedom and torque rigidity or drive. It is clear that the spline 30a, 31a, 32a of FIG. 6 may similarly be substituted by the gear reduction unit described with the meshing gears serving also as an axially free spline connection. In such construction the universal joints transmit higher torque at slower speed.

In the constructions of FIGS. 1–7 the pylon for the lift rotor is illustrated as being vertical. It has been mentioned, that with the two universal joint construction described herein, a greater extent of angular deviation or tilt of the rotor head can be achieved part of which arises from the fact that each of the two joints can tilt the usual amount to double the combined or overall angle of tilt. FIG. 8 shows a construction in which the pylon 78 is attached to the fuselage 79 at a considerable angle, for example at 30 degrees, inclining downwardly rearwardly. With this incline, the engine 80 of the aircraft at the cabin floor level is spaced a considerable distance rearwardly of the axis 81 of the rotor lift or a vertical line through the center of the rotor head. The cabin under the rotor head around the axis is free for cargo C alone which changes for each landing and hence can be distributed to effectively balance the changing cargo. The pylon incline from the vertical may be any angle desired. For example the incline may be the same as the normal tilt of the rotor from horizontal at cruising speed. With this tilt the universal joints are in alignment at cruising speed and tilt to out of alignment for hovering and other inclined positions of the rotor. Because of the construction of the universal joint unit, however, constant velocity is achieved at all tilt positions. The tilted pylon may be used with any of the constructions illustrated and described.

In order to reduce to a minimum, the bending forces applied to the connecting means, the pivots of the Cardan joints of the shaft universal joint unit, should be of the roller, ball bearing or antifriction type. A convenient construction is to have the forks carry the ball or roller bearings in which the pivot pins are mounted.

The Cardan universal joints put oscillatory tilting moments into the rotor hub and in order to assure rotor head stability, each blade axis is offset forwardly or rearwardly from the drive shaft axis to provide so called drag offset and the horns or pitch arms 50 carried by the blade spar extent in the opposite direction from blade offset as illustrated in Doman et al S.N. 751,685, filed July 29, 1958. This avoids the likehood of triggering tilting oscillations created by tilting moments from the Cardan joints or the universal joint unit. The rotor head is freely tiltable on the rotor universal joint and the blades have solely pitch movement or pivotal movement on their longitudinal axes with respect to the rotor head for cyclic and/or collective pitch changes. The blade spar horns 60 are connected by a swash plate link 61 with the usual swash plate for cyclic and/or collective pitch control of the blades.

The slip spline torque pressure or load should be as low as possible without unduly increasing the dimensions thereof in order to avoid brinelling or undue wear and seizing. The torque load upon the spline is a function of the ratio of the shaft torque divided by the diameter and the axial force exerted to move the movable spline element is this ratio multiplied by the coefficient of friction. The spline must be able to operate or transmit torque while subjected to this axial force.

This invention is presented to fill a need for improvements in a rotor with a universal joint of two Cardan joints in the drive shaft and connecting means having axial freedom of movement with torque rigidity. It is understood that various modifications in structure, as well as changes in mode of operation, assembly, and manner of use, may and often do occur to those skilled in the art, especially after benefiting from the teachings of the invention. Hence, it will be understood that this disclosure is illustrative of preferred means of embodying the invention in useful form by explaining the construction, operation and advantages thereof.

What is claimed is:

1. A rotor for a helicopter having a fuselage and the like comprising a non-rotating tubular pylon adapted to be carried by the fuselage, a rotor universal joint carried by the pylon including an outer shell and a joint center and a central cavity, a rotor head rotatably mounted on the rotor universal joint including a rotor hub and means carried by the hub to mount a plurality of blades for pitch change upon their longitudinal axis, a drive shaft passing through the pylon and having an axis; and a shaft universal joint unit operatively connected at one end with the drive shaft and operatively connected at the other end with the rotor hub including a pair of Cardan joints, one joint being located inboard of and the other joint being located outboard of the center of the rotor universal joint, the Cardan joints being phased 90° apart, a center link connecting one Cardan joint to the other, the midpoint of the center link being at or close to the center of the rotor universal joint when the Cardan joints are in axial alignment with the drive shaft, and connecting means having axial freedom of movement and torque rigidity.

2. A rotor as in claim 1 in which the connecting means is a spline carried by the center link and including a stub shaft connecting the universal joint unit with the rotor hub.

3. A rotor as in claim 1 including a reduction gear unit connected with the universal joint unit and having meshing gears, and the meshing gears forming the connecting means.

4. A rotor as in claim 1 in which the pylon is inclined downwardly rearwardly with respect to the fuselage at a substantial angle.

5. A rotor for a helicopter and the like comprising a non-rotating tubular pylon, a rotor universal joint carried by the pylon including an outer shell and a joint center and a central cavity, a rotor head rotatably mounted on the rotor universal joint including a rotor hub and means carried by the hub to mount a plurality of blades for pitch change upon their longitudinal axis, a drive shaft passing through the pylon and having an axis; and a shaft universal joint unit operatively connected at one end with the drive shaft and operatively connected at the other end with the rotor hub including a pair of Cardan joints, one joint being located inboard of and the other being located outboard of the center of the rotor universal joint, the Cardan joints being phased 90° apart, a center link connecting one Cardan joint to the other, the midpoint of the center link being at or close to the center of the rotor universal joint when the Cardan joints are in axial alignment with the drive saft, and connecting means having axial freedom of movement and torque rigidity connected between the outboard Cardan joint and the rotor hub.

6. A rotor as in claim 3 in which the connecting means is located outboard of the rotor universal joint and has a diameter at least as great as the diameter of the cavity therein.

7. A rotor as in claim 4 in which the connecting means is a spline means.

8. A rotor as in claim 4 in which the connecting means is an axially flexible radially rigid disk.

9. A rotor as in claim 6 including a stub shaft secured to the universal joint unit and the flexible disk and slidably mounted in the rotor hub.

10. A helicopter comprising a fuselage having a cabin and a cabin floor, an engine carried by the cabin floor, a non-rotating tubular pylon carried by the fuselage inclined downwardly rearwardly at a substantial angle, a rotor universal joint carried by the pylon including an outer shell and a joint center and a central cavity, a rotor head rotatably mounted on the rotor universal joint including a rotor hub and means carried by the hub to mount a plurality of blades for pitch change upon their longitudinal axis, a drive shaft passing through the pylon and extending through the cabin and operatively connected to the engine and having an axis; and a shaft universal joint unit operatively connected at one end with the drive shaft and operatively connected at the other end with the rotor hub including a pair of Cardan joints, one joint being located inboard of and the other joint being located outboard of the center of the rotor universal joint, the Cardan joints being phased 90° apart, a center link connecting one Cardan joint to the other, the midpoint of the center link being at or close to the center of the rotor universal joint when the Cardan joints are in axial alignment with the drive shaft, and connecting means having axial freedom of movement and torque rigidity.

References Cited in the file of this patent

UNITED STATES PATENTS

| | | |
|---|---|---|
| 2,514,205 | McDonald | July 4, 1950 |
| 2,677,431 | Prince | May 4, 1954 |
| 2,914,929 | Irons | Dec. 1, 1959 |

FOREIGN PATENTS

| | | |
|---|---|---|
| 124,136 | Australia | Apr. 28, 1945 |